(12) United States Patent
Depoutovitch et al.

(10) Patent No.: US 12,705,229 B2
(45) Date of Patent: Aug. 11, 2026

(54) SYSTEMS AND METHODS FOR GLOBAL CONSISTENCY IN DISTRIBUTED SHARED-DATA DATABASES

(71) Applicant: HUAWEI CLOUD COMPUTING TECHNOLOGIES CO., LTD., Gui Zhou Province (CN)

(72) Inventors: Alexandre Depoutovitch, Kanata (CA); Chong Chen, Kanata (CA); Jack Hon Wai Ng, Kanata (CA)

(73) Assignee: HUAWEI CLOUD COMPUTING TECHNOLOGIES CO., LTD., Gui Zhou (CN)

( * ) Notice: Subject to any disclaimer, the term of this patent is extended or adjusted under 35 U.S.C. 154(b) by 167 days.

(21) Appl. No.: 18/406,915

(22) Filed: Jan. 8, 2024

(65) Prior Publication Data

US 2025/0225123 A1 Jul. 10, 2025

(51) Int. Cl.
*G06F 16/23* (2019.01)
*G06F 16/27* (2019.01)

(52) U.S. Cl.
CPC ...... *G06F 16/2379* (2019.01); *G06F 16/2365* (2019.01); *G06F 16/27* (2019.01)

(58) Field of Classification Search
None
See application file for complete search history.

(56) References Cited

U.S. PATENT DOCUMENTS 9,646,022 B2 * 5/2017 Lin ........................ G06F 16/184
10,178,168 B2 1/2019 Annamalai et al.
11,604,597 B2 3/2023 Grosman et al.
2006/0271557 A1 * 11/2006 Harward .................. G06F 9/52
2014/0258233 A1 * 9/2014 Ducott, III ........... G06F 16/178 707/634
2018/0253463 A1 9/2018 Bastawala et al.

OTHER PUBLICATIONS

Oracle RAC 19c, Best Practices and Secret Internals, Anil Nair, Oracle Real Application Clusters (RAC) & ASM, 2022.
RAC Internals, Julian Dyke, CERN, Nov. 2008.

* cited by examiner

*Primary Examiner* — Amresh Singh

(57) ABSTRACT

Apparatus, systems, and methods for global consistency in distributed shared-data databases may be provided. According to an aspect a method may be provided for ensuring strong consistency in data retrieval. The method includes receiving, by a receiving node of a database, a query for a value of a data item in the database. The method may further include, requesting, by the receiving node, from each node of the plurality of nodes a latest timestamp corresponding to a latest transaction. The method may further include receiving, by the receiving node from said each node of the plurality of nodes, the latest timestamp. The method may further include managing, by the receiving node, a cache of the receiving node based on said each received latest timestamp. The method may further include reading, by the receiving node, the value of the data item.

20 Claims, 7 Drawing Sheets

500

505. Reading, by the receiving node, the value of the specific data item.

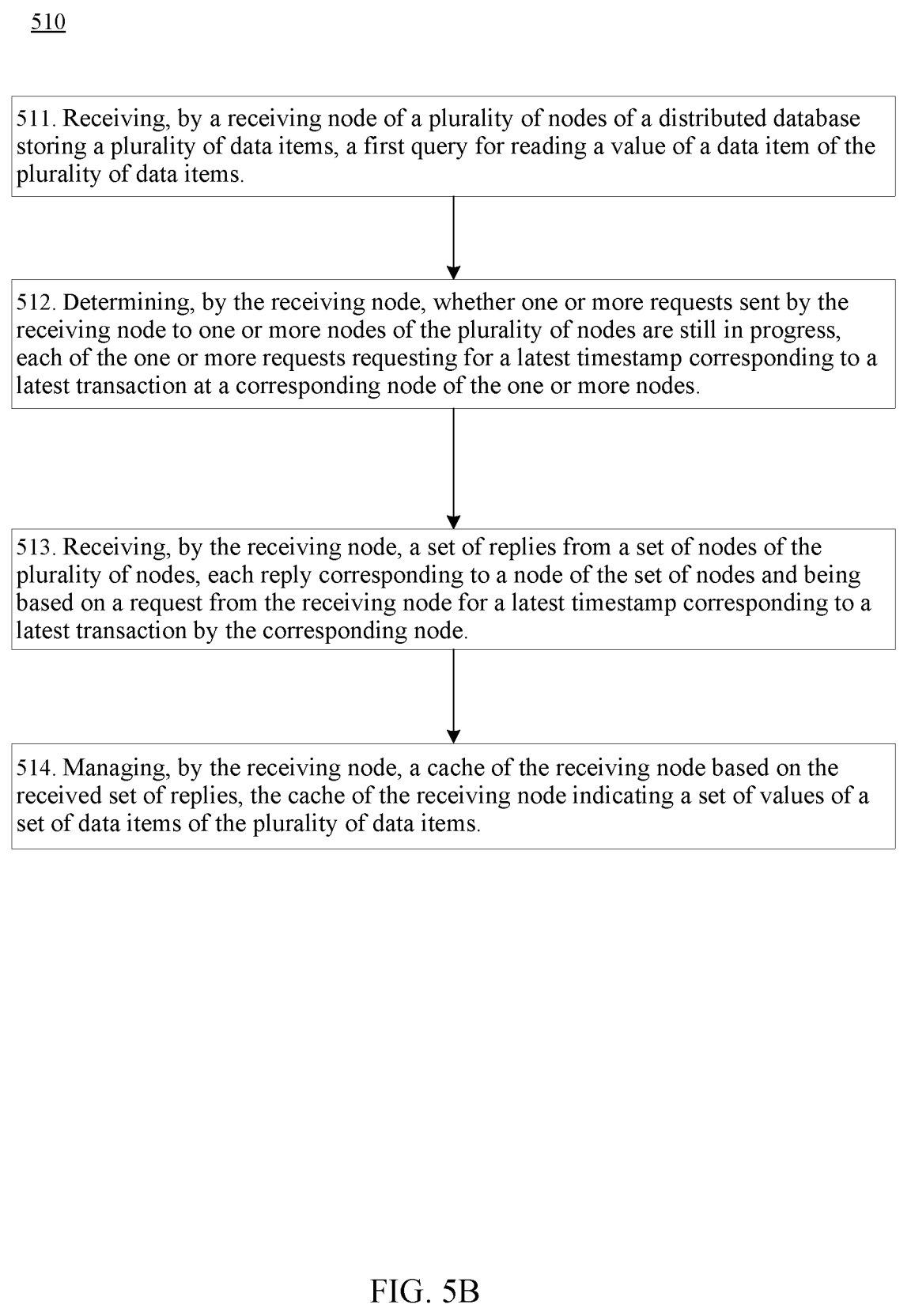

510

511. Receiving, by a receiving node of a plurality of nodes of a distributed database storing a plurality of data items, a first query for reading a value of a data item of the plurality of data items.

512. Determining, by the receiving node, whether one or more requests sent by the receiving node to one or more nodes of the plurality of nodes are still in progress, each of the one or more requests requesting for a latest timestamp corresponding to a latest transaction at a corresponding node of the one or more nodes.

513. Receiving, by the receiving node, a set of replies from a set of nodes of the plurality of nodes, each reply corresponding to a node of the set of nodes and being based on a request from the receiving node for a latest timestamp corresponding to a latest transaction by the corresponding node.

514. Managing, by the receiving node, a cache of the receiving node based on the received set of replies, the cache of the receiving node indicating a set of values of a set of data items of the plurality of data items.

FIG. 5B

SYSTEMS AND METHODS FOR GLOBAL CONSISTENCY IN DISTRIBUTED SHARED-DATA DATABASES

CROSS-REFERENCE TO RELATED APPLICATIONS

This is the first application filed for the present invention.

FIELD OF THE INVENTION

The present invention pertains to the field of distributed databases, and in particular to systems and methods for global consistency in distributed shared-data databases.

BACKGROUND

Data consistency in distributed databases is a critical challenge. Data consistency revolves around the complex task of ensuring that data remains accurate and up to date across various nodes and locations within the distributed database. However, the decentralized nature of distributed databases can delay this synchronization, leading to discrepancies across the system. Maintaining data consistency is vital as it affects decision-making and data integrity. Striving for strong consistency, where every part of the system sees the same data concurrently, can slow system performance. Additionally, managing network latency, hardware issues, and concurrent data access adds further complexity.

Therefore, improvements in global consistency in distributed shared-data databases are desirable.

This background information is provided to reveal information believed by the applicant to be of possible relevance to the present invention. No admission is necessarily intended, nor should be construed, that any of the preceding information constitutes prior art against the present invention.

SUMMARY

Apparatus, systems, and methods for global consistency in distributed shared-data databases may be provided. According to an aspect a method may be provided for ensuring strong consistency in data retrieval. The method may include receiving, by a receiving node, a query to read a value of a specific data item of the plurality of data items. The receiving node may be one of a plurality of nodes of a distributed database storing a plurality of data items. The method may further include requesting, by the receiving node, from each of the plurality of nodes other than the receiving node, a latest timestamp for a respective latest transaction conducted by each respective node of the plurality of nodes other than the receiving node. The method may further include receiving, by the receiving node from said each of the plurality of nodes other than the receiving node, the respective latest timestamp for the respective latest transaction. The method may further include managing, by the receiving node, a cache of the receiving node in accordance with transactions conducted by said each of the plurality of nodes other than the receiving node based on the respective latest timestamp for the respective latest transaction at said each of the plurality of nodes other than the receiving nodes. The cache of the receiving node may include a set of values corresponding to a set of data items of the plurality of data items. The method may further include reading, by the receiving node, the value of the specific data item.

Managing, by the receiving node, the cache of the of the receiving node may include one of: invalidating or updating one or more values of the set of values in the cache. The distributed database may be one of: a shared-data database, a shared-nothing database, a multi-writer database, and a single-writer-multiple-readers database. The query may be a read after write (RAW) query. The latest timestamp may be a clock counter of a clock corresponding to said each of the plurality of nodes other than the receiving node.

The clock corresponding to said each of the plurality of nodes other than the receiving node may be one of a vector clock or a vector-scalar clock and the respective latest timestamp is a vector timestamp. The vector timestamp may include an array of values, where each value may correspond to a different node of the plurality of nodes of the distributed database. Where the respective latest timestamp is a vector timestamp, managing, by the receiving node, the cache of the plurality of data items includes: for each vector timestamp received from said each of the plurality of nodes other than the receiving node, processing, by the receiving node, the cache of the plurality of data items based on a maximum value of the array of values corresponding to said each of the plurality of nodes other than the receiving node.

Reading, by the receiving node, the value of the specific data item may include obtaining, by the receiving node, the value of the specific data item from one of: the cache of the plurality of data items or a data storage of the distributed database. Reading, by the receiving node, the value of the specific data item may further include sending, by the receiving node, a reply including the obtained value of the specific data item.

The respective latest timestamp may be based on one or more of: a global clock or a local clock. The respective latest transaction may be a last committed transaction.

The method may further include determining, by the receiving node, that there are no requests sent by the receiving node to one or more nodes of the plurality of nodes for a latest timestamp in progress. The method may further include adding, by the receiving node, the query to a queue for current timestamp request for servicing the query for collection of latest timestamps. The queue for current timestamp request may be a queue for one or more queries currently being serviced for collection of latest timestamps. The method may further include removing, by the receiving node, the query from the queue for current timestamp request after receiving, by the receiving node from each of the plurality of nodes other than the receiving node, the respective latest timestamp for the respective latest transaction. The method may further include determining, by the receiving node, whether there are one or more queries in a queue for next timestamp request. The queue for next timestamp request may be a queue for one or more queries waiting to be transferred to the queue for current timestamp request.

According to another aspect, a method of managing queries may be provided. The method includes receiving, by a receiving node of a plurality of nodes of a distributed database storing a plurality of data items, a first query for reading a value of a data item of the plurality of data items. The method may further include determining, by the receiving node, whether one or more requests sent by the receiving node to one or more nodes of the plurality of nodes are still in progress, each of the one or more requests requesting for a latest timestamp corresponding to a latest transaction at a corresponding node of the one or more nodes. The method may further include receiving, by the receiving node, a set of replies from a set of nodes of the plurality of nodes, each reply corresponding to a node of the set of nodes and being based on a request from the receiving node for a latest timestamp corresponding to a latest transaction by the corresponding node. Said each reply further indicating the latest timestamp. The method may further include managing, by the receiving node, a cache of the receiving node based on the received set of replies, the cache of the receiving node indicating a set of values of a set of data items of the plurality of data items.

Determining, by the receiving node, whether one or more requests sent by the receiving node to one or more nodes of the plurality of nodes are still in progress may include determining, by the receiving node, that one or more requests sent by the receiving node to the one or more nodes of the plurality of nodes for a latest timestamp are still in progress. The one or more requests may correspond to one or more queries in a queue for current timestamp request. The queue for current timestamp request may be a queue for one or more queries currently being serviced for collection of latest timestamp, the one or more queries in the queue for current timestamp request received by the receiving node before the first query. The received set of replies may correspond to the one or more queries in the queue for current timestamp request. The method may further include adding, by the receiving node, the first query to a queue for next timestamp request. The queue for next timestamp request may be queue for one or more queries waiting to be transferred to the queue for current timestamp request.

The set of replies from the set of nodes of the plurality of nodes may correspond to the one or more requests sent by the receiving node to the one or more nodes of the plurality of nodes that are still in progress. The method may further include removing, by the receiving node, the one or more queries from the queue for current timestamp request. The method may further include executing, by the receiving node, the one or more queries removed from the queue for current timestamp request. The method may further include determining, by the receiving node, that there are one or more queries in the queue for next timestamp request including the first query. The method may further include moving, by the receiving node, the one or more queries in the queue for next timestamp request from the queue for next timestamp request to the queue for current timestamp request.

Determining, by the receiving node, whether one or more requests sent by the receiving node to one or more nodes of the plurality of nodes are still in progress may include determining, by the receiving node, that there are no requests sent by the receiving node to the one or more nodes of the plurality of nodes for the latest timestamp in progress. The method may further include adding, by the receiving node, the first query to a queue for current timestamp request. The queue for current timestamp request may be a queue for one or more queries that are currently being serviced for collection of latest timestamps. The method may further include requesting, by the receiving node, from each of the plurality of nodes other than the receiving node, a latest timestamp for a respective latest transaction conducted by said each node.

Receiving, by the receiving node, the set of replies from the set of nodes of the plurality of nodes may include receiving, by the receiving node from said each of the plurality of nodes other than the receiving node, the latest timestamp for the respective latest transaction. Managing, by the receiving node, a cache of the receiving node based on the received set of replies may include managing, by the receiving node, the cache of the receiving node based on the received reply from said each of the plurality of nodes other than the receiving node.

The method may further include removing, by the receiving node, the first query from the queue for current timestamp request. The method may further include executing, by the receiving node, the first query. The method may further include determining, by the receiving node, whether there are one or more queries in a queue for next timestamp request. The queue for next timestamp request may be a queue for one or more queries waiting to be transferred to the queue for current timestamp request.

According to another aspect, an apparatus may be provided. The apparatus includes modules or electronics configured to perform one or more of the methods and systems described herein.

According to one aspect, an apparatus may be provided, where the apparatus includes: one or more processors and a memory, configured to store instructions which, when executed by the one or more processors, configure the apparatus to receive, by a receiving node, the receiving node being one of a plurality of nodes of a distributed database storing a plurality of data items, a query to read a value of a specific data item of the plurality of data items. The instructions, when executed by the one or more processors, also configure the apparatus to request, by the receiving node, from each of the plurality of nodes other than the receiving node, a latest timestamp for a respective latest transaction conducted by each respective node of the plurality of nodes other than the receiving node. The instructions, when executed by the one or more processors, also configure the apparatus to receive, by the receiving node from said each of the plurality of nodes other than the receiving node, the respective latest timestamp for the respective latest transaction. The instructions, when executed by the one or more processors, also configure the apparatus to manage, by the receiving node, a cache of the receiving node in accordance with transactions conducted by said each of the plurality of nodes other than the receiving node based on the respective latest timestamp for the respective latest transaction at said each of the plurality of nodes other than the receiving nodes, the cache of the receiving node comprising a set of values corresponding to a set of data items of the plurality of data items. The instructions, when executed by the one or more processors, also configure the apparatus to read, by the receiving node, the value of the specific data item.

According to an aspect, an apparatus may be provided, with the apparatus comprising a non-transitory computer readable medium having instructions stored thereon which, when executed by a processor, configure the apparatus for: receiving, by a receiving node, the receiving node being one of a plurality of nodes of a distributed database storing a plurality of data items, a query to read a value of a specific data item of the plurality of data items; requesting, by the receiving node, from each of the plurality of nodes other than the receiving node, a latest timestamp for a respective latest transaction conducted by each respective node of the plurality of nodes other than the receiving node; receiving, by the receiving node from said each of the plurality of nodes other than the receiving node, the respective latest timestamp for the respective latest transaction; managing, by the receiving node, a cache of the receiving node in accordance with transactions conducted by said each of the plurality of nodes other than the receiving node based on the respective latest timestamp for the respective latest transaction at said each of the plurality of nodes other than the receiving nodes, the cache of the receiving node comprising a set of values corresponding to a set of data items of the plurality of data items; and reading, by the receiving node, the value of the specific data item.

In some embodiments, the instructions, when executed by the processor, further configure the apparatus for managing, by the receiving node, the cache of the of the receiving node by one of: invalidating or updating one or more values of the set of values in the cache.

According to another aspect, an apparatus may be provided, with the apparatus comprising a non-transitory computer readable medium that has instructions stored thereon which, when executed by a processor, configure the apparatus for: receiving, by a receiving node of a plurality of nodes of a distributed database storing a plurality of data items, a first query for reading a value of a data item of the plurality of data items; determining, by the receiving node, whether one or more requests sent by the receiving node to one or more nodes of the plurality of nodes are still in progress, each of the one or more requests requesting for a latest timestamp corresponding to a latest transaction at a corresponding node of the one or more nodes; receiving, by the receiving node, a set of replies from a set of nodes of the plurality of nodes, each reply corresponding to a node of the set of nodes and being based on a request from the receiving node for a latest timestamp corresponding to a latest transaction by the corresponding node, said each reply further indicating the latest timestamp; and managing, by the receiving node, a cache of the receiving node based on the received set of replies, the cache of the receiving node indicating a set of values of a set of data items of the plurality of data items.

In some embodiments, determining, by the receiving node, whether one or more requests sent by the receiving node to one or more nodes of the plurality of nodes are still in progress comprises determining, by the receiving node, that there are no requests sent by the receiving node to the one or more nodes of the plurality of nodes for the latest timestamp in progress. And, the instructions, when executed by the processor, may further configure the apparatus for adding, by the receiving node, the first query to a queue for current timestamp request, the queue for current timestamp request comprising one or more queries that are currently being serviced for collection of latest timestamps; requesting, by the receiving node, from each of the plurality of nodes other than the receiving node, a latest timestamp for a respective latest transaction conducted by said each node, wherein: receiving, by the receiving node, the set of replies from the set of nodes of the plurality of nodes comprises receiving, by the receiving node from said each of the plurality of nodes other than the receiving node, the latest timestamp for the respective latest transaction; managing, by the receiving node, a cache of the receiving node based on the received set of replies comprises managing, by the receiving node, the cache of the receiving node based on the received reply from said each of the plurality of nodes other than the receiving node.

According to another aspect, a computer readable medium may be provided, where the computer readable medium stores program code executed by a device and the program code is used to perform one or more of the methods and systems described herein.

According to one aspect, a chip may be provided, where the chip includes a processor and a data interface, and the processor reads, by using the data interface, an instruction stored in a memory, to perform one or more of the methods and systems described herein. Aspects may further include the memory.

Other aspects of the disclosure provide for apparatus, and systems configured to implement the methods according to the first aspect disclosed herein. For example, wireless stations and access points can be configured with machine readable memory containing instructions, which when executed by the processors of these devices, configures the device to perform one or more of the methods and systems described herein.

Embodiments have been described above in conjunctions with aspects of the present invention upon which they can be implemented. Those skilled in the art will appreciate that embodiments may be implemented in conjunction with the aspect with which they are described, but may also be implemented with other embodiments of that aspect. When embodiments are mutually exclusive, or are otherwise incompatible with each other, it will be apparent to those skilled in the art. Some embodiments may be described in relation to one aspect, but may also be applicable to other aspects, as will be apparent to those of skill in the art.

BRIEF DESCRIPTION OF THE FIGURES

Further features and advantages of the present invention will become apparent from the following detailed description, taken in combination with the appended drawings, in which:

FIG. 5B illustrates a method of managing queries at a node of a distributed database, according to an aspect.

It will be noted that throughout the appended drawings, like features are identified by like reference numerals.

DETAILED DESCRIPTION

Figure 1:
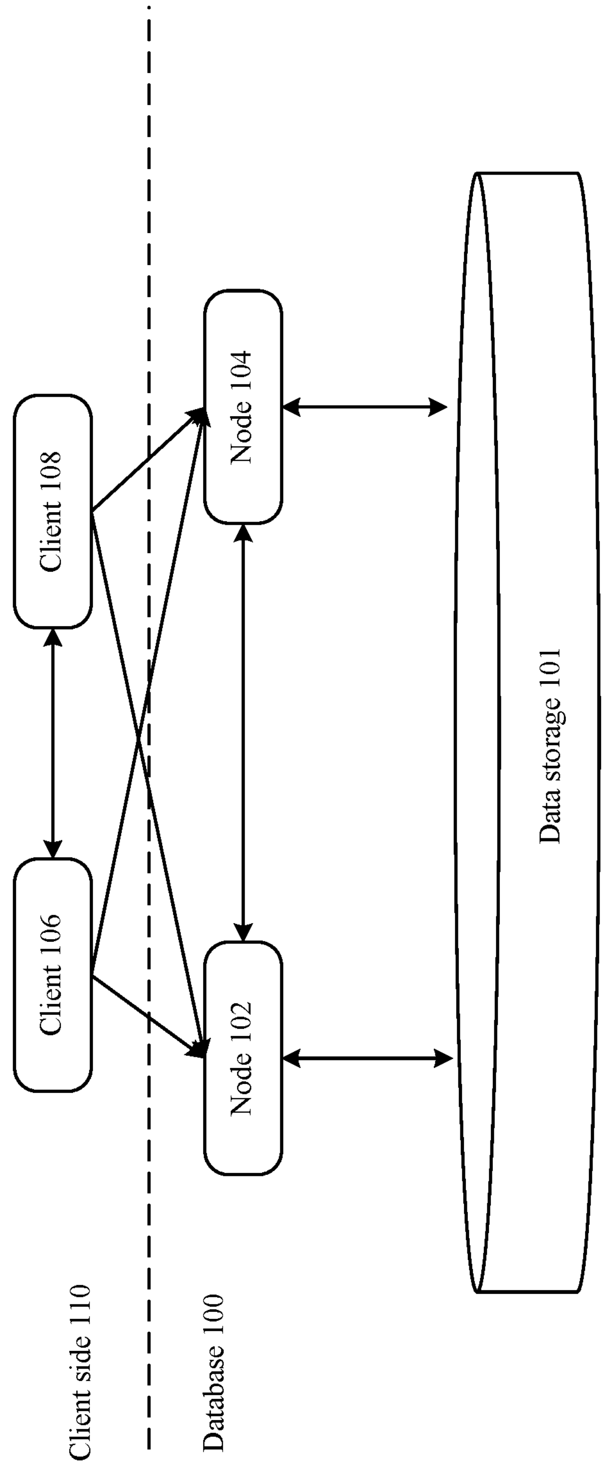
FIG. 1 illustrates a schema of a distributed database.

Apparatus, systems, and methods for global consistency in distributed shared-data databases may be provided. According to an aspect a method, based on flowchart 400, may be provided for managing queries received at a node of a database. The method may include receiving at the node a first query for reading a data time. The node may determine whether there are one or more timestamp requests in progress. The one or more timestamp requests may refer to one or more requests for latest timestamps (or clock counters). If there are one or more timestamp requests in progress, then, the first query is put into a queue for the next request timestamp. If there are no timestamp requests in progress, then the node may move the first query to a queue for current timestamp request. The node may then issue a timestamp request which may include sending to each node of the database a request for latest clock counter. The node may then wait for request completion and obtain latest clock counter values. The node may then update or invalidate its cache based on received clock counter values and execute the query. After receiving the latest clock counter values, the node may then check if there are any queries in the queue for next timestamp request. If there are no queries in the queue for the next timestamp request, then the node may wait till another user query arrives. If there are queries in the queue for the next timestamp request, then the node may move queries from the queue for the next timestamp request to the queue for the current timestamp request. The node may then issue another timestamp request.

According to another aspect, a method 500 may be provided for ensuring strong consistency in data retrieval. The method includes receiving, by a receiving node of a plurality of nodes of a database, a query for a value of a data item stored in the database. The method may further include, requesting, by the receiving node, from each node of the plurality of nodes a latest timestamp corresponding to a latest transaction associated with the corresponding said each node. The method may further include receiving, by the receiving node from said each node of the plurality of nodes, the latest timestamp. The method may further include managing, by the receiving node, a cache of the receiving node based on each received latest timestamp. The method may further include reading, by the receiving node, the value of the data item.

A distributed database may refer to any software that runs simultaneously on different hardware nodes connected by a network that allows client applications to write, read and modify previously written data. A shared-data database may refer to a database where all database nodes have the same access to all the database data. In contrast to shared-data database, in a shared-nothing approach (or shared-nothing database), each node has a dedicated exclusive subset of data. A master-follower model of a database refers to a database where access to each piece of data is not exclusive, but there is a dedicated node that is guaranteed to have the latest version of the data. A node may refer to a machine that can perform one or more of: a write, a read and routing. A node may further refer to a proxy node(s) that hide other nodes and provide routing.

FIG. 1 illustrates a schema of a distributed database 100. Database 100 may comprise a data storage 101 and one or more database nodes (or nodes) 102 and 104. On the client side 110, clients 106 and 108 may send requests to the nodes 102 and 104 a variety of requests, including but not limited to, read, write, modify, administrative, and transaction management requests.

In a distributed database, the data consistency problem is an important issue to solve. The issue comes from the fact that multiple nodes may have copies of a same data item. When one node changes the data item, other nodes may end up having stale copies of the data item, unless special protocols are followed. Stale data items result in inconsistencies between same data items stored at different locations in the database. For example, when a sum of money is transferred between two accounts, a node might end up serving an old value of the source account and new value of the target account, resulting in a larger total value of both accounts.

One of the main requirements of consistency in distributed systems is global reads after write (GRAW). A natural expectation is that any read, which a user knows to happen after a write, should return the value that has been written by that write. If only one copy of data exists (usually on data storage), data consistency would not be a problem, but this is not usually the case. For performance reasons, nodes frequently cache data locally as local access is much faster than querying a remote data storage.

Figure 2:
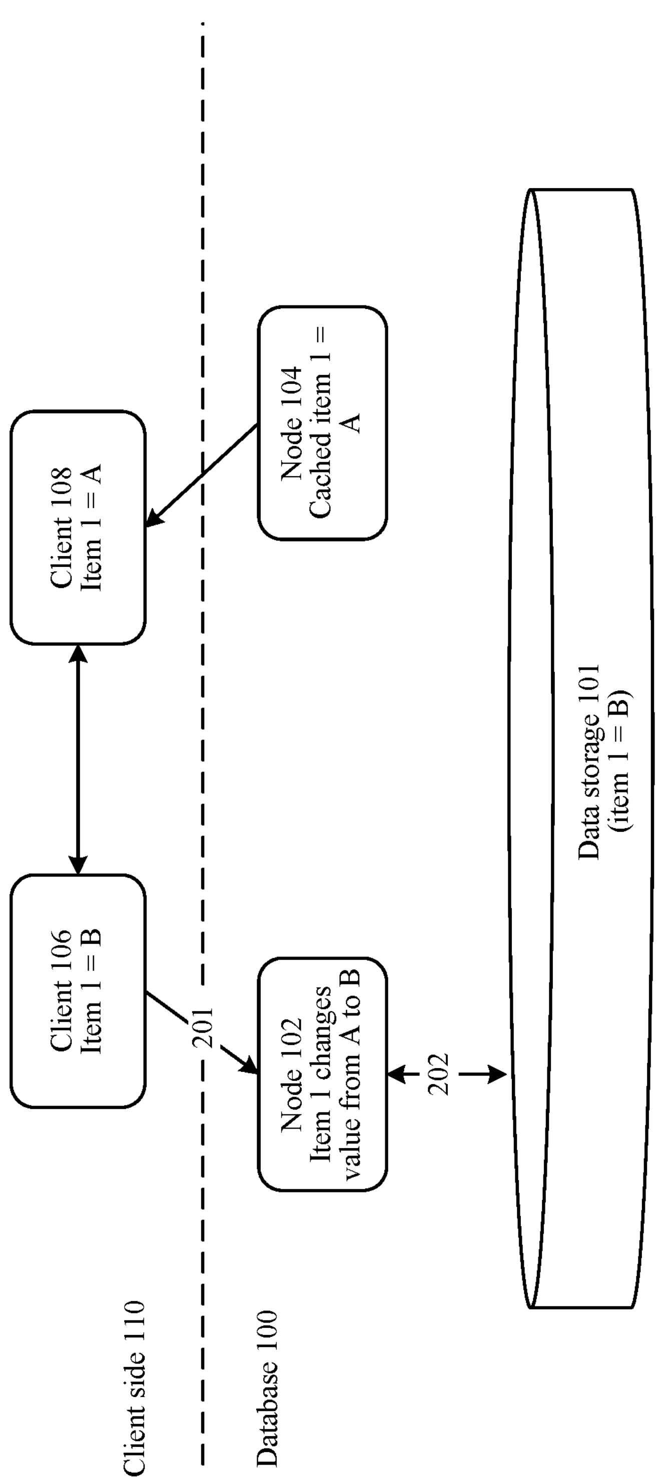
FIG. 2 illustrates an example of a data consistency problem.

FIG. 2 illustrates an example of a data consistency problem. In FIG. 2, item 1 may have an initial value 'A'. Client 106 may request 201 node 102 to change item 1 (data item 1) to value 'B' by executing a change request 201 on node 102. Accordingly, both data storage 101 and the cache of Node 102 may change 202 the value of item 1 to the new value 'B'. But Node 104 may still have an old value for Item 1 in its cache, as it has not been notified about the change yet. In this case, if Client 1 106, or another client, e.g., Client 108, requests a read operation from Node 104 of Item 1, node 104 will return value 'A', which is an old value of item 1. This inconsistency in item 1 value may be referred to as the GRAW problem as many applications are not capable of functioning when an old value is returned.

Some existing solutions attempt to solve the GRAW problem by using a dedicated machine for caching data items called caching facility, or CF. Every change, before being acknowledged, must be propagated to the CF node, and all items are read from the CF node in order to be accessed by other nodes. Thus, CF node is always up to date. However, this approach has a number of limitations. For example, the CF approach may result in increased load on the network due to the requirement to perform extra communications to update the CF. Accordingly, a more performant (and expensive) network hardware may be required. Further, the CF approach may result in performance penalty due to the necessity to delay transaction acknowledgement to propagate changes to the CF node. Further, scalability may be limited by the performance of the CF node, which is a single bottleneck of the system.

Another existing solution attempts to solve the GRAW problem by delaying a change (write transaction) acknowledgement until every other node in the system acknowledges it. In these solutions, each read and write operation is stamped SCN (system change number) so that each node can correctly order every read with respect to the already performed writes. However, this solution has its own limitations. For example, this solution may result in increased update latency due to sending requests to all nodes. Further, request retries might be required on conflicts in SCN between nodes. Another limitation is that on large clusters, SCN-related messages can account for 15% of the overall network traffic. As a result, more performant (and expensive) network hardware may be required.

Another existing solution is specific to databases with a computer-storage separation, single writer node and multiple read-only nodes. On a group flush, which needs to happen in order to make a transaction commit, this solution is based on sending a message through storage node to read replicas with invalidated items (pages) id, receiving reply, and only then acknowledging a transaction. This solution may have limitations including increased update latency, increased traffic, and requiring performant and expensive network hardware.

Another existing solution to ensure a read-after-write consistency for the replicated data relies on associating the write requests with unique version numbers and using them to obtain the data. A server associates a write request with a unique version number and returns the version number to a client, which can use it in a subsequent read request for the data. The disadvantage of this approach is the requirement that client software must be modified to support the version number exchange. Thus, clients may need to attach the version number with every communication with the database and between each other.

According to an aspect, systems, methods and apparatuses may be provided for method of solving the GRAW consistency problem, which may assure global consistency for a distributed database. The systems, methods and apparatus described herein may solve the GRAW consistency problem with minimal network performance overhead while being transparent to the system users (applications).

Figure 3:
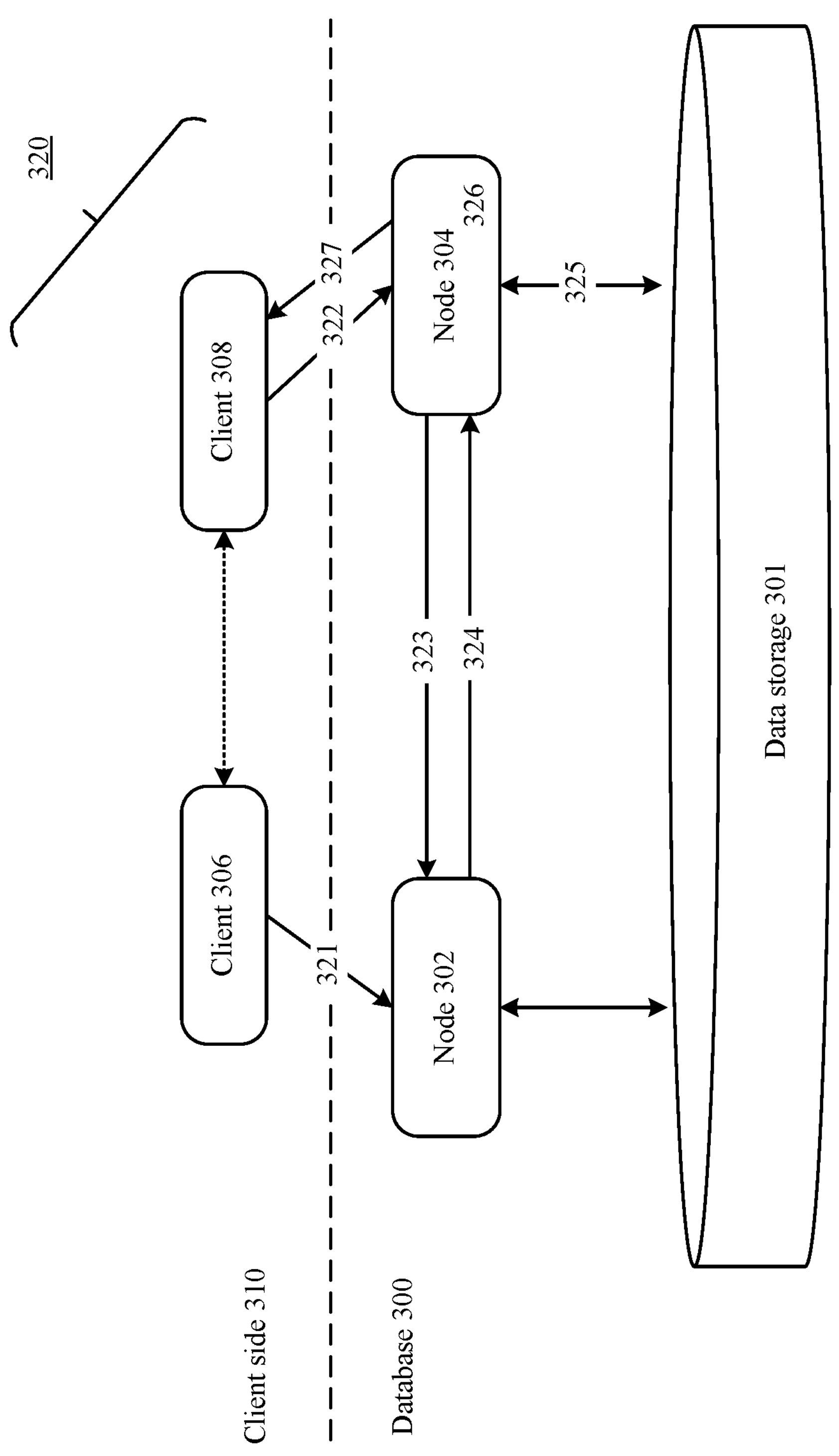
FIG. 3 illustrates a method for maintaining data consistency in a distributed database, according to an aspect.

FIG. 3 illustrates a method 320 for maintaining data consistency in a distributed database, according to an aspect. The distributed database 300 (or database as used herein) may be understood to have several properties. One such property is the database state, which may be defined as being information about the database 300 that is visible to a user. Such information about the database 300 may include information about the data items stored in the database 300 or the values of the data items themselves. All changes to the database state, e.g., writes, may be ordered as a function of when each change occurs with respect to the other changes, at least within the context of a single database node. The database 300 may comprise a plurality of nodes including nodes 302 and 304. The distributed database may further comprise a data storage 301 for storing a plurality of data items. The progress of each database node in changing the database state may be measured. The progress of each database node may be measured by assigning an increasing number to every change in the database state. This number may be called a clock counter. Other terms may also be used to refer to this number, for example, logical sequence number (LSN) or system change number (SCN). Clocks can be local (each node may have its own independent clock) or global (a global clock may exist that considers progress of all nodes). Advantageously, in some embodiments of the present disclosure, the clocks or counters at the database nodes may not need to be synchronized with each other or with a master clock.

Further, all nodes may track their changes, and a mechanism may be used to find out what items have been changed. Accordingly, each of nodes 302 and 304 may track their changes. For example, logging may be a mechanism where all changes to the database 300 are written to a persistent storage in the form of records that describe the changes.

According to an aspect, when a client 308, from client side 310, needs to execute a query with GRAW consistency, client 308 may mark the query as such before sending the query 322 to a database node 304. The query 322 may be a query for a data item value of a data item stored in the database. When such a query arrives at the node 304, the node may send a message 323 to each node of the plurality nodes of the distributed database 300 other than the node 304 (e.g., node 302) asking for their latest progress. The message 323 may be a request for the latest progress counter or the latest timestamp corresponding to the latest change each node has made to the database state. The request may not be specific to the data item for which the data item value was queried by the query 322. The sending node 304 may then wait for replies (e.g., reply 324) from each node of the plurality nodes of the distributed database 300 other than the node 304. Once all the replies are received, the query execution on the sending node 304 waits for the changes by the other nodes to be processed 325 locally, at the sending node 304. According to an aspect, processing locally may include reading, from the data storage 301, log (change) records produced by other nodes up to and including the received latest progress counter (e.g., LSN, or the latest timestamp corresponding to the latest change each node has made to the database state). Processing locally may further include reading all changed data item identifications (IDs) and invalidating them in the local cache, and subsequently, rereading the data item values from the data storage 301.

For example, a query node sending a request for the latest counter value (or timestamp) from five other nodes will receive five different counter values. In accordance with these five different counter values, the query node may, for each of the five nodes that provided the query node a latest counter value, read, from the data storage, the log records produced by the node in question, up to and including the received latest counter value. The query node may then connect to the data storage and retrieve the data item values of the data items identified by the log records of the five nodes in question.

The log records may be stored and shared in the data storage 301. Each log record may be marked with a progress counter (clock counter or timestamp). Each log record may correspond to a changed data item (i.e., a data item that has had its data item value changed). Each log record may further indicate or include an ID of the data item that has been modified. The changed data item's ID may be read from the log record accordingly. Thus, whenever a log record is written to a shared storage, the log record may be timestamped with a progress counter of the node that performs the write. As a result, a stream of log records may be created per node and ordered by the corresponding progress counter (clock counter). Thus, for example, when node 304 receives the latest progress counter (or latest timestamp) of the node 302, node 304 can retrieve and read the log records of node 302, from the shared storage (data storage 301). In an embodiment, node 304 may read the portion of node 302's log record that has not been previously read.

Once processing is done, the node 304 executing a query may be guaranteed or assured to have the latest data up to the point of the read query 322 arrival at the node 304 because the node 304 has either updated or invalidated all locally cached data items up to the point of the arrival of the query in question and can execute the query returning 327 a result consistent with the latest modification of the data item.

The method 320 may include a client 306 updating 321 an item (data item, specific item) using node 302. For example, client 306 may send a request to node 302 to update the data item value of the data item to a new value. Node 302 may update the value of the item locally in its cache and in the data storage 301. Subsequently, client 308 may send a request 322 to node 304 to read the latest value of the item. The request 322 may be a read query request indicating a read-after-write (RAW) or a GRAW.

In some embodiments, Client 308 can be the same as Client 306, where client 306 may execute queries on multiple nodes. In some embodiments Client 308 can be a different client which communicates with client 306 in a third application-specific way.

Node 304 may send a request 323 to each node (e.g., node 302) of the database 300 (other than node 304) for a latest progress counter (latest clock counter or latest timestamp) corresponding to the latest change to the database state that each node of the database 300 other than the node 304 has made. Each node (e.g., 302) of the database other than node 304 may send a reply 324 to node 304, the reply including the requested latest progress counter.

Node 304 may then manage its cache based on the received progress counter from each node of the database other than node 304. In some embodiments, managing its cache may include updating its cache according to the received latest progress counter from each node of the database other than node 304. Updating the cache may refer to updating one or more data items in the cache to reflect the changes in database state made by each node of the database other than node 304 according to the respective received latest progress counter. That is, updating the cache may include updating the data item value of the data item in question, according to the latest data item value attributed to the data item. In some embodiments, managing its cache may include invalidating its cache according to the received latest progress counter from each node of the database other than node 304. Invalidating the cache may mean marking one or more data items in its cache as no longer valid or up to date.

Node 304 may then process 326 the query received at action 322. Processing the query may include obtaining the latest value of the data item identified in the query. Obtaining the latest value of the data item may include reading the value from either the local cache at node 304 or from the data storage 301. In some embodiments, node 304 may read the latest value of the item from its local cache if node 304 managed its cache by updating the item in the cache such that the item in the cache reflects its latest state (or value) as in the data storage. In some embodiments, node 304 may read the latest value of the data item from the data storage 301 if node 304 managed its cache by invalidating the item in the cache such that the item in the local cache is marked as invalid or stale (thus the latest value of the item is to be read from the data storage).

After obtaining the latest value of the data item, node 304 may send a reply 327 to the client, the reply including the obtained latest value of the data item.

The methods, system and apparatus described herein may apply to any distributed database system that allows to read and update data item values of data items stored in the database. This may include, for example, relational multi-writer shared data database.

Figure 4:
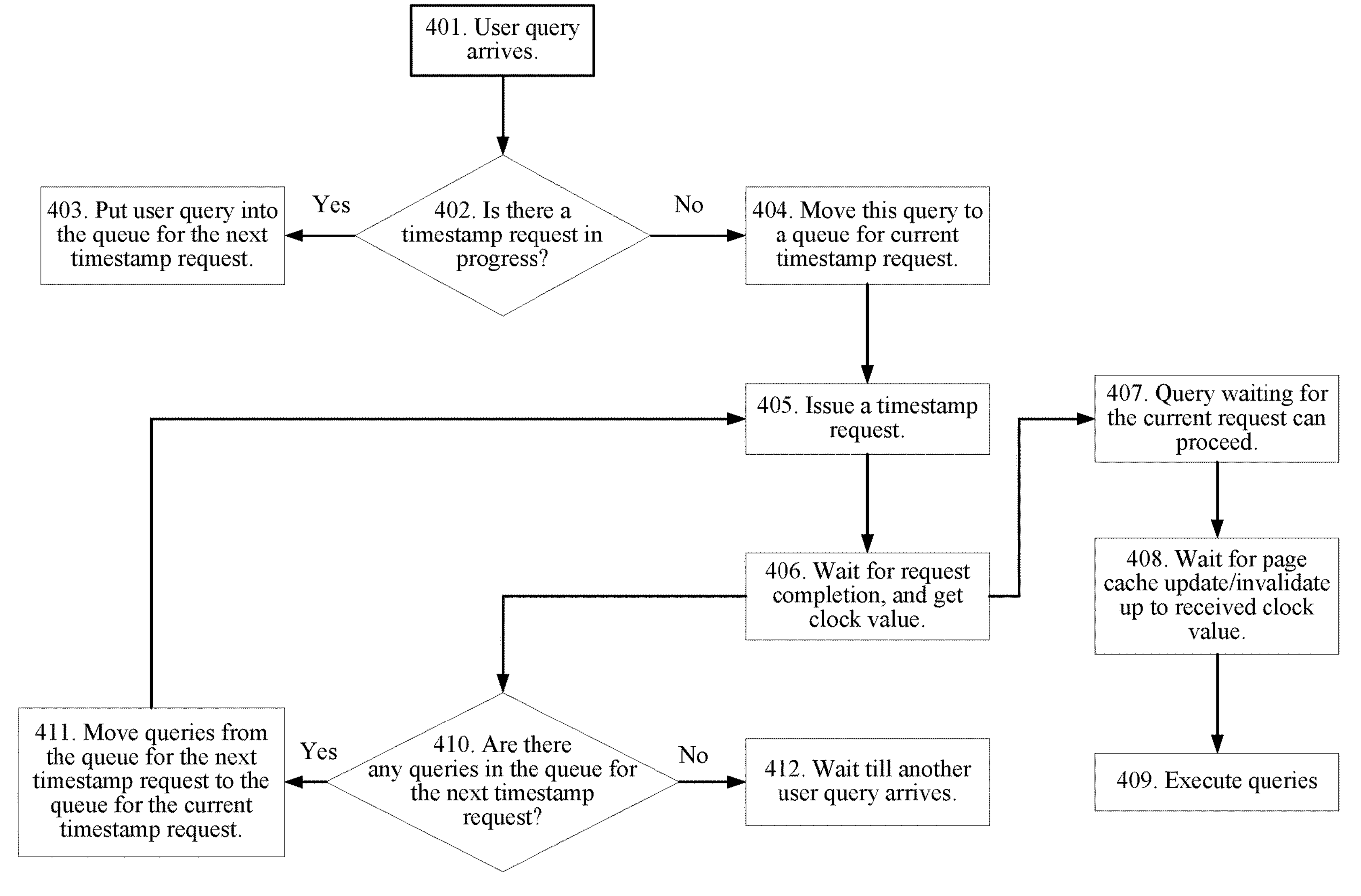
FIG. 4 illustrates a flowchart of a method for managing query requests, according to an aspect.

FIG. 4 illustrates a flowchart of a method for managing query requests, according to an aspect. Flowchart 400 may allow for reduction of network traffic by queuing clock counter requests by batching clock counter requests. In some embodiments, flowchart 400 may be performed at the received node. In an embodiment, flowchart 400 may be combined with method 320 of FIG. 3.

Referring to FIG. 3, sending a request 323 to each node of the plurality of nodes of the database 300 for the latest clock counter whenever a new query arrives can be very expensive, as the query rate may be very high (e.g., 1 million queries per second). Flowchart 400 may allow for reducing the number of network requests (e.g., parallel or overlapping network requests), by sending a single request at a time, and another one to be sent as soon as the previous receives the reply. A request may refer to a request by a receiving node to each node of the database for a latest clock counter.

Flowchart 400 may include, at action 401, a user query arriving at a receiving node (e.g., node 304) of a plurality of nodes of a database. The user query may be for a data item (data item value) stored in a database. At action 402, the receiving node may determine if there is a timestamp request in progress (referring to are one or more pending requests, sent from the node 304 to one or more nodes of the plurality of nodes, for latest clock counter values). If there is a timestamp request in progress, then, at action 403, the user query is put into a queue for next timestamp request. If there is no timestamp request in progress, then at action 404, the user query is moved to a queue for current timestamp request for its completion. The queue for current timestamp request is a queue for one or more queries that are being processed for latest clock counter. Flowchart 400 may further include, at action 405, issuing a timestamp request. Issuing a timestamp request may include the receiving node, at action 405, sending to each node of the database a request for latest clock counter.

Flowchart 400 may further include, at action 406, waiting for request completion and obtaining clock value. At action 406, the receiving node may wait for replies for latest clock counter based on requests sent at action 405. Once request completion arrives, queries on the waiting list for its completion (e.g., one or more queries waiting in the queue for current timestamp request for latest clock counters) are released with the received clock value. After receiving the replies for latest clock counter, all user queries waiting in the queue for current timestamp request may be removed from the queue for current timestamp request. Flowchart 400 may further include, at action 407, the one or more user queries removed from the queue for current timestamp request can proceed with retrieving the data that requested in the one or more user queries. Flowchart 400 may further include, at action 408, waiting for page cache update/invalidate up to received clock value. At action 408, the receiving node may update or invalidate its cache up to the received clock value. Flowchart 400 may further include, at action 409, executing the one or more queries based on the updated/invalidated cache.

In some embodiment, flowchart 400 may include, after obtaining latest clock values, at action 410, the receiving node may determine whether there are any queries in the queue for the next timestamp request. If there are no queries in the queue for the next timestamp request, then at action 412, the receiving node may wait till another user query arrives. If there are one or more queries in the queue for the next timestamp request, then at action 411, the receiving node may move the one or more queries from the queue for the next timestamp request to the queue for the current timestamp request. Flowchart 400 may then loop back to action 405 as illustrated and described herein.

Flowchart 400 may allow for reduced network traffic and load. In some cases, the waiting time may be even shorter due to decreased network utilization.

According to an aspect, one or more methods, system and apparatuses described herein, including method 320 and flowchart 400 may apply to transactional databases. A transactional database may refer to a database in which all changes made to the database by a specific user session are invisible until the user confirms them, i.e., commits a transaction. Thus, all changes appear in the database atomically after they are respectively committed.

In the case of transactional databases, the request 323, in method 300, may be a request for the counter value that corresponds to the last committed transaction. Thus, the node 340 may send a request 323, from each node of the plurality of nodes of the database 300 other than node 304, for a clock counter value (or timestamp) corresponding to a last committed transaction.

In transactional database, only changes to the committed transactions may be visible to the other queries, thus, there is no need for a node (e.g., node 304) executing a read requests to see the latest, but (yet) uncommitted changes. In transactional database, method 320 and flowchart 400 may result in a reduced query delay, as less data on the query executing node (e.g., node 304) may need to be updated or invalidated.

According to an aspect, one or more methods, system and apparatus described herein, including method 320 and flowchart 400 may be compatible with different types of clocks, including, for example, Lamport (scalar) clocks, vector clocks, matrix clocks, VS (vector-scalar) clock, and hybrid clocks.

In some embodiments, for vector clocks or vector-scalar (VS) clocks (used with multiple writer node configurations), the returned clock counters may be vectors where each vector component $C_{ij}$ indicates a timestamp received from node I with the timestamp being based on a clock on node j. In such embodiments, a query that requires consistency may need to receive, in replies 324, changes from node j done up to node j clock value equal to $$\max_{\forall i} C_{ij}.$$

Where, the formula, max $$\max_{\forall i} c_{ij},$$

indicates that the clock value will be a per-component maximum of timestamps received from all nodes. Here $C_{ij}$ corresponds to j-th component of vector clock received from node i, where and i and j are between 0 and N−1, and N is number of nodes in the database.

For example, node 302 may have a logical clock that is a vector clock or a VS clock. Reply 324 may be a vector (e.g., a vector timestamp) comprising a plurality of vector components (or an array of values), each corresponding to and representing a clock counter of a different node of the database. While reply 324 from node 302 may include indication of clock counters of nodes other than node 302, node 304 may still need to receive respective latest clock counters (latest timestamp) from each of the nodes other than node 302. Once node 304 receives the latest clock counters from each of the plurality of nodes of the database, node 304 may manage its cache according to the received latest clock counter. For example, in the case of node 302 returning a reply 324 comprising a vector timestamp, node 304 may manage its cache based on the vector component, in reply 324 (e.g., vector timestamp), corresponding to node 302. Accordingly, for each vector timestamp received from each of the plurality of nodes (having a vector or VS clock) node 304 may manage its cache based on a maximum value of the vector components (or array of values) corresponding to said each of the plurality of nodes.

Accordingly, in the case of vector and VS clocks, the replies 324 from each node of the plurality of nodes (each having a vector clock, VS clock, or a clock that returns a vector timestamp reply) may comprise a respective clock counter value (e.g., a timestamp or a latest timestamp) which is a vector timestamp. The vector timestamp may comprise an array of values (or vector component), where each value (or vector component) may correspond to a different node of the plurality of nodes of the distributed database. For each vector timestamp received from each of the plurality of nodes (other than the query node 304), the query node or node 304 may process its local cache based on a maximum value of the array of values in the vector timestamp, the maximum value corresponding to said each of the plurality of nodes other than the receiving node.

According to an aspect, methods, systems and apparatus relating to data consistency may be configured at different granularities. For example, data consistency may be maintained at one or more of: database level, node level, user level, connection level, transaction level, individual statement level and others. In embodiments, only specific statements may be executed with the required consistency, and queries for which consistency is not important or is achieved by other means may not need to have this overhead.

According to an aspect, one or more methods, systems and apparatuses described herein may be used together with the broadcast transaction commit method (e.g., used by Oracle read) depending on the current workload. For workloads where the number of writes is not significantly smaller than number of reads that require global consistency, then one or more methods described herein may be used.

As described herein, one or more embodiments 320, 400 and 500 for establishing GRAW consistency may be provided. The one or more methods may provide users with consistent data when using distributed databases. According to an aspect, the one or more methods may obviate the need for centralized caching, which may allow for avoiding expensive components, eliminating scalability bottleneck, and reducing network load (unlike methods used in existing solutions).

The one or more methods described herein may further obviate the need for broadcasting of all the write completions, which may further reduce load on the network (where rate of transactions can reach million per second). Obviating the need for broadcasting of all the write completions may further reduce individual write transaction latencies (unlike method used in existing solutions). The one or more methods described herein may further obviate the need for modifications to client software, which may allow for easier adoption and compatibility with legacy software.

Figure 5A:
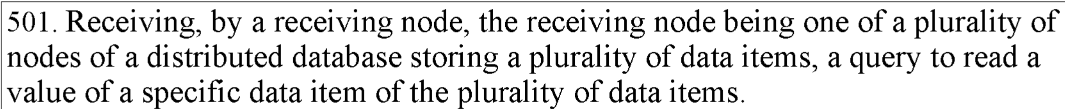
FIG. 5A illustrates a method for maintaining data consistency in a distributed database, according to an aspect.
Figure 5A:
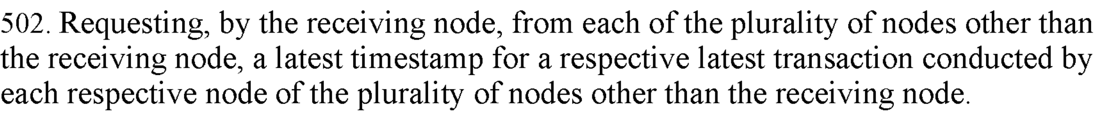
Figure 5A:
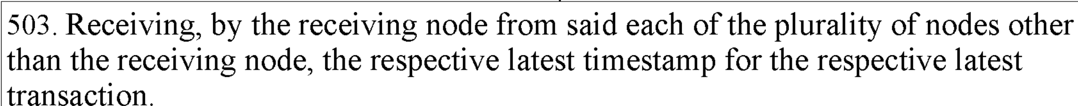
Figure 5A:
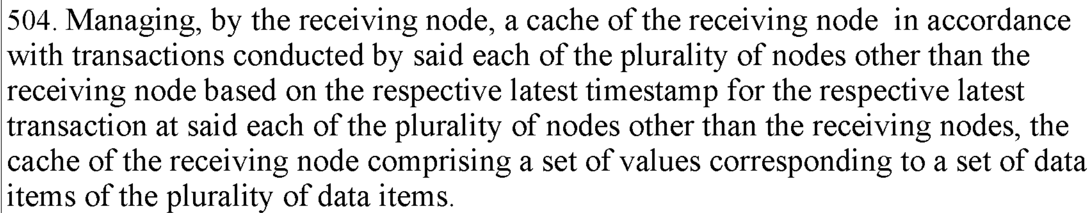

FIG. 5A illustrates a method for maintaining data consistency in a distributed database, according to an aspect. Method 500 may include receiving 501, by a receiving node (e.g., node 304), a query to read a value of a specific data item of the plurality of data items. The receiving node may be one of a plurality of nodes of a distributed database storing a plurality of data items. The method 500 may further include requesting 502, by the receiving node, from each of the plurality of nodes other than the receiving node, a latest timestamp for a respective latest transaction conducted by each respective node of the plurality of nodes other than the receiving node. The method 500 may further include receiving 503, by the receiving node from said each of the plurality of nodes other than the receiving node, the respective latest timestamp for the respective latest transaction. The method 500 may further include managing 504, by the receiving node, a cache of the receiving node in accordance with transactions conducted by said each of the plurality of nodes other than the receiving node based on the respective latest timestamp for the respective latest transaction at said each of the plurality of nodes other than the receiving nodes. The cache of the receiving node may include a set of values corresponding to a set of data items of the plurality of data items. The method may further include reading, by the receiving node, the value of the specific data item.

In some embodiments, managing 504, by the receiving node, the cache of the of the receiving node may comprise one of: invalidating or updating one or more the values of the set of values in the cache. The distributed database may be one of: a shared-data database, a shared-nothing database, a multi-writer database, and a single-writer-multiple-readers database. The query may be a (RAW) query. The latest timestamp may be a clock counter of a clock corresponding to said each of the plurality of nodes other than the receiving node.

The clock corresponding to said each of the plurality of nodes other than the receiving node may be one of a vector clock or a vector-scalar clock and the respective latest timestamp is a vector timestamp. The vector timestamp may include an array of values, where each value may correspond to a different node of the plurality of nodes of the distributed database. Where the respective latest timestamp is a vector timestamp, managing, by the receiving node, the cache of the plurality of data items includes: for each vector timestamp received from said each of the plurality of nodes other than the receiving node, processing, by the receiving node, the cache of the plurality of data items based on a maximum value of the array of values corresponding to said each of the plurality of nodes other than the receiving node.

Reading 505, by the receiving node, the value of the specific data item may include obtaining, by the receiving node, the value of the specific data item from one of: the cache of the plurality of data items or a data storage of the distributed database. Reading, by the receiving node, the value of the specific data item may further include sending, by the receiving node, a reply including the obtained value of the specific data item.

The respective latest timestamp may be based on one or more of: a global clock or a local clock. The respective latest transaction may be a last committed transaction.

In some embodiments, method 500 may further include determining, by the receiving node, that there are no requests sent by the receiving node to one or more nodes of the plurality of nodes for a latest timestamp in progress. The method 500 may further include adding, by the receiving node, the query to a queue for current timestamp request for servicing the query for collection of latest timestamps. The queue for current timestamp request may be queue for one or more queries currently being serviced for collection of latest timestamps.

In some embodiments, the method 500 may further include removing, by the receiving node, the query from the queue for current timestamp request after receiving, by the receiving node from each of the plurality of nodes other than the receiving node, the respective latest timestamp for the respective latest transaction. In some embodiments, method 500 may further include determining, by the receiving node, whether there are one or more queries in a queue for next timestamp request. The queue for next timestamp request may be a queue for one or more queries waiting to be transferred to the queue for current timestamp request.

In some embodiments, method 500 may further include determining, by the receiving node, whether there are one or more queries in a queue for next timestamp request. The queue for next timestamp request may be a queue for one or more queries waiting to be transferred to the queue for current timestamp request FIG. 5B illustrates a method of managing queries at a node of a distributed database, according to an aspect. Method 510 may include receiving 511, by a receiving node of a plurality of nodes of a distributed database storing a plurality of data items, a first query for reading a value of a data item of the plurality of data items. The method 510 may further include determining 512, by the receiving node, whether one or more requests sent by the receiving node to one or more nodes of the plurality of nodes are still in progress, each of the one or more requests requesting for a latest timestamp corresponding to a latest transaction at a corresponding node of the one or more nodes. The method 510 may further include receiving 513, by the receiving node, a set of replies from a set of nodes of the plurality of nodes, each reply corresponding to a node of the set of nodes and being based on a request from the receiving node for a latest timestamp corresponding to a latest transaction by the corresponding node. Said each reply further indicating the latest timestamp. Method 510 may further include managing 514, by the receiving node, a cache of the receiving node based on the received set of replies, the cache of the receiving node indicating a set of values of a set of data items of the plurality of data items.

In some embodiments, determining 512, by the receiving node, whether one or more requests sent by the receiving node to one or more nodes of the plurality of nodes are still in progress may include determining, by the receiving node, that one or more requests sent by the receiving node to the one or more nodes of the plurality of nodes for a latest timestamp are still in progress. The one or more requests may correspond to one or more queries in a queue for current timestamp request. The queue for current timestamp request may be a queue for one or more queries currently being serviced for collection of latest timestamps, the one or more queries in the queue for current timestamp request received by the receiving node before the first query. The received set of replies may correspond to the one or more queries in the queue for current timestamp request. In some embodiments, method 510 may further include adding, by the receiving node, the first query to a queue for next timestamp request. The queue for next timestamp request may be a queue for one or more queries waiting to be transferred to the queue for current timestamp request.

The set of replies from the set of nodes of the plurality of nodes may correspond to the one or more requests sent by the receiving node to the one or more nodes of the plurality of nodes that are still in progress. Method 510 may further include removing, by the receiving node, the one or more queries from the queue for current timestamp request. Method 510 may further include executing, by the receiving node, the one or more queries removed from the queue for current timestamp request. Method 510 may further include determining, by the receiving node, that there are one or more queries in the queue for next timestamp request including the first query. Method 510 may further include moving, by the receiving node, the one or more queries in the queue for next timestamp request from the queue for next timestamp request to the queue for current timestamp request.

In some embodiments, determining 512, by the receiving node, whether one or more requests sent by the receiving node to one or more nodes of the plurality of nodes are still in progress may include determining, by the receiving node, that there are no requests sent by the receiving node to the one or more nodes of the plurality of nodes for the latest timestamp in progress. The method 510 may further include adding, by the receiving node, the first query to a queue for current timestamp request. The queue for current timestamp request may be a queue for one or more queries that are currently being serviced for collection of latest timestamps. Method 510 may further include requesting, by the receiving node, from each of the plurality of nodes other than the receiving node, a latest timestamp for a respective latest transaction conducted by said each node.

In some embodiments, receiving 513, by the receiving node, the set of replies from the set of nodes of the plurality of nodes may include receiving, by the receiving node from said each of the plurality of nodes other than the receiving node, the latest timestamp for the respective latest transaction. Managing 514, by the receiving node, a cache of the receiving node based on the received set of replies may include managing, by the receiving node, the cache of the receiving node based on the received reply from said each of the plurality of nodes other than the receiving node.

In some embodiments, method 510 may further include removing, by the receiving node, the first query from the queue for current timestamp request. The method 510 may further include executing, by the receiving node, the first query. The method 510 may further include determining, by the receiving node, whether there are one or more queries in a queue for next timestamp request, the queue for next timestamp request may be a queue for one or more queries waiting to be transferred to the queue for current timestamp request.

Figure 6:
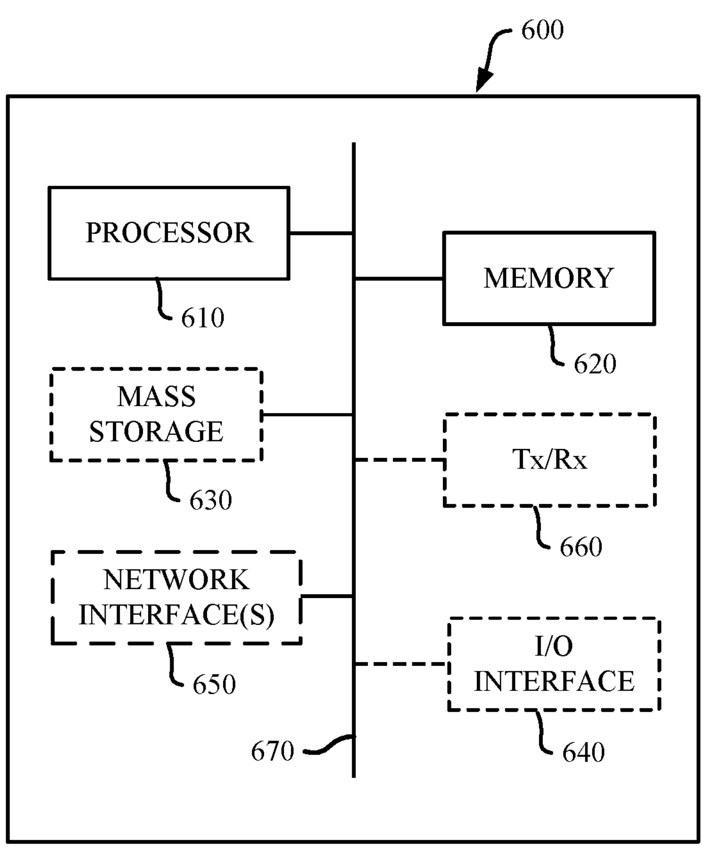
FIG. 6 illustrates an apparatus that may perform any or all of operations of the above methods and features explicitly or implicitly described herein, according to different aspects of the present disclosure.

FIG. 6 illustrates an apparatus 600 that may perform any or all of operations of the above methods and features explicitly or implicitly described herein, according to different aspects of the present disclosure. For example, a computer equipped with network function may be configured as the apparatus 600. In some aspect, apparatus 600 can be a device that connects to the network infrastructure over a radio interface, such as a mobile phone, smart phone or other such device that may be classified as user equipment (UE). In some aspects, the apparatus 600 may be a Machine Type Communications (MTC) device (also referred to as a machine-to-machine (m2m) device), or another such device that may be categorized as a UE despite not providing a direct service to a user. In some aspects, apparatus 600 may be used to implement one or more components, systems, mechanisms according to one or more aspects described herein.

As shown, the apparatus 600 may include a processor 610, such as a Central Processing Unit (CPU) or specialized processors such as a Graphics Processing Unit (GPU) or other such processor unit, memory 620, non-transitory mass storage 630, input-output interface 640, network interface 650, and a transceiver 660, all of which are communicatively coupled via bi-directional bus 670. Transceiver 660 may include one or multiple antennas According to certain aspects, any or all of the depicted elements may be utilized, or only a subset of the elements. Further, apparatus 600 may contain multiple instances of certain elements, such as multiple processors, memories, or transceivers. Also, elements of the hardware device may be directly coupled to other elements without the bi-directional bus. Additionally, or alternatively to a processor and memory, other electronics or processing electronics, such as integrated circuits, application specific integrated circuits, field programmable gate arrays, digital circuitry, analog circuitry, chips, dies, multichip modules, substrates or the like, or a combination thereof may be employed for performing the required logical operations.

The memory 620 may include any type of non-transitory memory such as static random-access memory (SRAM), dynamic random-access memory (DRAM), synchronous DRAM (SDRAM), read-only memory (ROM), any combination of such, or the like. The mass storage element 630 may include any type of non-transitory storage device, such as a solid-state drive, hard disk drive, a magnetic disk drive, an optical disk drive, USB drive, or any computer program product configured to store data and machine executable program code. According to certain aspects, the memory 620 or mass storage 630 may have recorded thereon statements and instructions executable by the processor 610 for performing any method operations described herein.

The processor 610 and memory 620 may function together as a chipset which may be provided together for installation into wireless communication apparatus 600 in order to implement WLAN functionality. The chipset may be configured to receive as input data including but not limited to PPDUs from the network interface 650. The chipset may be configured to output data including but not limited to PPDUs to the network interface 650.

Aspects of the present disclosure can be implemented using electronics hardware, software, or a combination thereof. In some aspects, this may be implemented by one or multiple computer processors executing program instructions stored in memory. In some aspects, the invention is implemented partially or fully in hardware, for example using one or more field programmable gate arrays (FPGAs) or application specific integrated circuits (ASICs) to rapidly perform processing operations.

It will be appreciated that, although specific embodiments of the technology have been described herein for purposes of illustration, various modifications may be made without departing from the scope of the technology. The specification and drawings are, accordingly, to be regarded simply as an illustration of the invention as defined by the appended claims, and are contemplated to cover any and all modifications, variations, combinations or equivalents that fall within the scope of the present invention. In particular, it is within the scope of the technology to provide a computer program product or program element, or a program storage or memory device such as a magnetic or optical wire, tape or disc, or the like, for storing signals readable by a machine, for controlling the operation of a computer according to the method of the technology and/or to structure some or all of its components in accordance with the system of the technology.

Acts associated with the method described herein can be implemented as coded instructions in a computer program product. In other words, the computer program product is a computer-readable medium upon which software code is recorded to execute the method when the computer program product is loaded into memory and executed on the microprocessor of the wireless communication device.

Further, each operation of the method may be executed on any computing device, such as a personal computer, server, PDA, or the like and pursuant to one or more, or a part of one or more, program elements, modules or objects generated from any programming language, such as C++, Java, or the like. In addition, each operation, or a file or object or the like implementing each said operation, may be executed by special purpose hardware or a circuit module designed for that purpose.

Through the descriptions of the preceding embodiments, the present invention may be implemented by using hardware only or by using software and a necessary universal hardware platform. Based on such understandings, the technical solution of the present invention may be embodied in the form of a software product. The software product may be stored in a non-volatile or non-transitory storage medium, which can be a compact disk read-only memory (CD-ROM), USB flash disk, or a removable hard disk. The software product includes a number of instructions that enable a computer device (personal computer, server, or network device) to execute the methods provided in the embodiments of the present invention. For example, such an execution may correspond to a simulation of the logical operations as described herein. The software product may additionally or alternatively include number of instructions that enable a computer device to execute operations for configuring or programming a digital logic apparatus in accordance with embodiments of the present invention.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

What is claimed is:

1. A method comprising:

receiving, by a receiving node, the receiving node being one of a plurality of nodes of a distributed database storing a plurality of data items, a query to read a value of a specific data item of the plurality of data items;

requesting, by the receiving node, from each of the plurality of nodes other than the receiving node, a latest timestamp for a respective latest transaction conducted by each respective node of the plurality of nodes other than the receiving node;

receiving, by the receiving node from said each of the plurality of nodes other than the receiving node, the respective latest timestamp for the respective latest transaction;

managing, by the receiving node, a cache of the receiving node, the cache comprising a set of values corresponding to a set of data items of the plurality of data items, by, for each of the plurality of nodes other than the receiving node, processing log records of transactions conducted by that node up to the respective latest timestamp, and based on the log records, invalidating or updating corresponding values in the cache;

reading, by the receiving node, the value of the specific data item;

determining, by the receiving node, that there are no requests sent by the receiving node to one or more nodes of the plurality of nodes for a latest timestamp in progress;

adding, by the receiving node, the query to a queue for current timestamp request, the queue for current timestamp request being a queue for one or more queries currently being serviced for collection of latest timestamps removing, by the receiving node, the query from the queue for current timestamp request after receiving, by the receiving node from each of the plurality of nodes other than the receiving node, the respective latest timestamp for the respective latest transaction; and determining, by the receiving node, whether there are one or more queries in a queue for next timestamp request, the queue for next timestamp request being a queue for one or more queries waiting to be transferred to the queue for current timestamp request.

2. The method of claim 1, wherein the distributed database is one of: a shared-data database, a shared-nothing database, a multi-writer database, and a single-writer-multiple-readers database.

3. The method of claim 1, wherein the query is a read after write (RAW) query.

4. The method of claim 1, wherein the latest timestamp is a clock counter of a clock corresponding to said each of the plurality of nodes other than the receiving node.

5. The method of claim 3, wherein the clock corresponding to said each of the plurality of nodes other than the receiving node is one of a vector clock or a vector-scalar clock, and the respective latest timestamp is a vector timestamp comprising an array of values, each value corresponding to a different node of the plurality of nodes of the distributed database, and wherein managing, by the receiving node, the cache of the plurality of data items comprises:

for each vector timestamp received from said each of the plurality of nodes other than the receiving node, processing, by the receiving node, the cache of the plurality of data items based on a maximum value of the array of values corresponding to said each of the plurality of nodes other than the receiving node.

6. The method of claim 1, wherein reading, by the receiving node, the value of the specific data item comprises:

obtaining, by the receiving node, the value of the specific data item from one of: the cache of the plurality of data items or a data storage of the distributed database; and sending, by the receiving node, a reply comprising the obtained value of the specific data item.

7. The method of claim 1, wherein the respective latest transaction is a last committed transaction.

8. An apparatus, comprising:

one or more processors; and a memory storing instructions which, when executed by the one or more processors, configure the apparatus to perform the method of claim 1.

9. The apparatus of claim 8, wherein the distributed database is one of: a shared-data database, a shared-nothing database, a multi-writer database, and a single-writer-multiple-readers database.

10. The apparatus of claim 8, wherein the query is a read after write (RAW) query.

11. The apparatus of claim 8, wherein the latest timestamp is a clock counter of a clock corresponding to said each of the plurality of nodes other than the receiving node.

12. The apparatus of claim 8, wherein the clock corresponding to said each of the plurality of nodes other than the receiving node is one of a vector clock or a vector-scalar clock, and the respective latest timestamp is a vector timestamp comprising an array of values, each value corresponding to a different node of the plurality of nodes of the distributed database, and wherein managing, by the receiving node, the cache of the plurality of data items comprises:

for each vector timestamp received from said each of the plurality of nodes other than the receiving node, processing, by the receiving node, the cache of the plurality of data items based on a maximum value of the array of values corresponding to said each of the plurality of nodes other than the receiving node.

13. The apparatus of claim 8, wherein reading, by the receiving node, the value of the specific data item comprises:

obtaining, by the receiving node, the value of the specific data item from one of: the cache of the plurality of data items or a data storage of the distributed database; and sending, by the receiving node, a reply comprising the obtained value of the specific data item.

14. The apparatus of claim 8, wherein the respective latest transaction is a last committed transaction.

15. A method of managing queries, the method comprising:

receiving, by a receiving node of a plurality of nodes of a distributed database storing a plurality of data items, a first query for reading a value of a data item of the plurality of data items;

determining, by the receiving node, whether one or more requests sent by the receiving node to one or more nodes of the plurality of nodes are still in progress, each of the one or more requests requesting for a latest timestamp corresponding to a latest transaction at a corresponding node of the one or more nodes;

receiving, by the receiving node, a set of replies from a set of nodes of the plurality of nodes, each reply corresponding to a node of the set of nodes and being based on a request from the receiving node for a latest timestamp corresponding to a latest transaction by the corresponding node, said each reply further indicating the latest timestamp;

managing, by the receiving node, a cache of the receiving node, the cache comprising a set of values of a set of data items of the plurality of data items, by, for each of the plurality of nodes other than the receiving node, processing log records of transactions conducted by that node up to the respective latest timestamp, and based on the log records, invalidating or updating corresponding values in the cache;

wherein determining, by the receiving node, whether one or more requests sent by the receiving node to one or more nodes of the plurality of nodes are still in progress comprises determining, by the receiving node, that one or more requests sent by the receiving node to the one or more nodes of the plurality of nodes for a latest timestamp are still in progress, the one or more requests corresponding to one or more queries in a queue for current timestamp request, the queue for current timestamp request being a queue for one or more queries currently being serviced for collection of latest timestamp, the one or more queries in the queue for current timestamp request received by the receiving node before the first query, and wherein the received set of replies corresponds to the one or more queries in the queue for current timestamp request, the method further comprising:

adding, by the receiving node, the first query to a queue for next timestamp request, the queue for next timestamp request being a queue for one or more queries waiting to be transferred to the queue for current timestamp request.

16. The method of claim 15, wherein the set of replies from the set of nodes of the plurality of nodes correspond to the one or more requests sent by the receiving node to the one or more nodes of the plurality of nodes that are still in progress, the method further comprising:

removing, by the receiving node, the one or more queries from the queue for current timestamp request;

executing, by the receiving node, the one or more queries removed from the queue for current timestamp request;

determining, by the receiving node, that there are one or more queries in the queue for next timestamp request including the first query; and moving, by the receiving node, the one or more queries in the queue for next timestamp request from the queue for next timestamp request to the queue for current timestamp request.

17. An apparatus, comprising:

one or more processors; and a memory storing instructions which, when executed by the one or more processors, configure the apparatus to perform the method of claim 15.

18. The apparatus of claim 17, wherein the set of replies from the set of nodes of the plurality of nodes correspond to the one or more requests sent by the receiving node to the one or more nodes of the plurality of nodes that are still in progress, wherein the instructions which, when executed by the one or more processors, further configure the apparatus for:

removing, by the receiving node, the one or more queries from the queue for current timestamp request;

executing, by the receiving node, the one or more queries removed from the queue for current timestamp request;

determining, by the receiving node, that there are one or more queries in the queue for next timestamp request including the first query; and moving, by the receiving node, the one or more queries in the queue for next timestamp request from the queue for next timestamp request to the queue for current timestamp request.

19. A method of managing queries, the method comprising:

receiving, by a receiving node of a plurality of nodes of a distributed database storing a plurality of data items, a first query for reading a value of a data item of the plurality of data items:

determining, by the receiving node, whether one or more requests sent by the receiving node to one or more nodes of the plurality of nodes are still in progress, each of the one or more requests requesting for a latest timestamp corresponding to a latest transaction at a corresponding node of the one or more nodes;

receiving, by the receiving node, a set of replies from a set of nodes of the plurality of nodes, each reply corresponding to a node of the set of nodes and being based on a request from the receiving node for a latest timestamp corresponding to a latest transaction by the corresponding node, said each reply further indicating the latest timestamp;

managing, by the receiving node, a cache of the receiving node, the cache comprising a set of values of a set of data items of the plurality of data items, by, for each of the plurality of nodes other than the receiving node, processing log records of transactions conducted by that node up to the respective latest timestamp, and based on the log records, invalidating or updating corresponding values in the cache;

wherein determining, by the receiving node, whether one or more requests sent by the receiving node to one or more nodes of the plurality of nodes are still in progress comprises determining, by the receiving node, that there are no requests sent by the receiving node to the one or more nodes of the plurality of nodes for the latest timestamp in progress, the method further comprising:

adding, by the receiving node, the first query to a queue for current timestamp request, the queue for current timestamp request being a queue for one or more queries that are currently being serviced for collection of latest timestamps:

requesting, by the receiving node, from each of the plurality of nodes other than the receiving node, a latest timestamp for a respective latest transaction conducted by said each node;

removing, by the receiving node, the first query from the queue for current timestamp request;

executing, by the receiving node, the first query; and determining, by the receiving node, whether there are one or more queries in a queue for next timestamp request, the queue for next timestamp request being a queue for one or more queries waiting to be transferred to the queue for current timestamp request.

20. An apparatus, comprising:

one or more processors; and a memory storing instructions which, when executed by the one or more processors, configure the apparatus to perform the method of claim 19.

* * * * *